United States Patent
Verkleeren

[19]

[11] Patent Number: 5,762,036
[45] Date of Patent: Jun. 9, 1998

[54] SPLIT PLENUM INTAKE MANIFOLD WITH VARIABLE RUNNERS

[75] Inventor: Ronald Luce Verkleeren, Dearborn, Mich.

[73] Assignee: Ford Global Technologies, Inc., Dearborn, Mich.

[21] Appl. No.: 784,893

[22] Filed: Jan. 16, 1997

[51] Int. Cl.$^6$ .................. F02M 35/10; F02B 27/02
[52] U.S. Cl. ................. 123/184.31; 123/184.55; 123/184.56
[58] Field of Search ............ 123/184.55, 184.56, 123/184.53, 184.61, 184.38, 184.31

[56] References Cited

U.S. PATENT DOCUMENTS

| | | | |
|---|---|---|---|
| 2,835,235 | 5/1958 | Gassmann | 123/184.55 |
| 4,590,895 | 5/1986 | Yada et al. | 123/393 |
| 4,619,226 | 10/1986 | Ueda et al. | 123/184.55 |
| 4,643,138 | 2/1987 | Ruf et al. | 123/184.55 |
| 4,646,689 | 3/1987 | Katsumoto et al. | 123/184.55 |
| 4,765,286 | 8/1988 | Lyjak | 123/184.55 |
| 4,858,568 | 8/1989 | Obayashi et al. | 123/184.55 |
| 4,952,310 | 8/1990 | Hitomi et al. | 123/432 |
| 5,143,026 | 9/1992 | Brustle et al. | 123/184.55 |
| 5,156,117 | 10/1992 | Muller et al. | 123/184.55 |
| 5,211,139 | 5/1993 | Houle et al. | 123/184.47 |

FOREIGN PATENT DOCUMENTS

| | | | |
|---|---|---|---|
| 3714953 | 11/1987 | Germany | 123/184.55 |
| 3825000 | 2/1989 | Germany | 123/184.55 |
| 532866 | 2/1958 | Italy | 123/184.55 |
| 59-188027 | 10/1984 | Japan | 123/184.55 |
| 60-147529 | 8/1985 | Japan | 123/184.55 |
| 60-224922 | 11/1985 | Japan | 123/184.55 |
| 2239899 | 7/1991 | United Kingdom | 123/184.55 |

*Primary Examiner*—David A. Okonsky
*Attorney, Agent, or Firm*—Donald A. Wilkinson

[57] ABSTRACT

An intake manifold assembly (10) for use with an internal combustion engine. The manifold assembly (10) includes three main components, a cover (12), base (14) and runner beam (16). The cover (12) and base (14) mate to form cavity (18), encompassing a variable plenum (54) upstream of variable runners (52) formed by runner beam (16) and the variable runners (52). The variable plenum (54) of the exemplary embodiment is selectively split into two sections by a divider wall (34) and middle runner blade (48a). Rotation of the runner beam (16) causes a change in the length and/or cross-sectional area of the variable intake runners (52) as well as changing the variable plenum (54), thus varying the tuning of the intake flow into the engine, to optimize engine operation.

18 Claims, 3 Drawing Sheets

5,762,036

SPLIT PLENUM INTAKE MANIFOLD WITH VARIABLE RUNNERS

FIELD OF THE INVENTION

The present invention relates to intake manifolds use with internal combustion engines on vehicles and more particularly to intake manifolds which can vary geometry during engine operation.

BACKGROUND OF THE INVENTION

Conventional intake manifolds employed on engines for vehicles have a fixed geometry for the air flow. With a fixed intake system, the speed at which intake tuning occurs is also fixed. Since the engine operates over a broad RPM range, and since a different geometry may be ideal for different engine speeds, fixed geometry intake systems are designed with a geometry which is only optimal for a limited range of engine speeds, thus compromising between torque at low speeds and horsepower at high engine speeds.

Some have attempted to allow for variable intake geometry and have met with varying degrees of success. With some designs, the cost is excessive due to complex designs, either in fabrication or assembly, with difficulty in servicing the assembly, while others keep the cost down but at the expense of a very limited amount of variable tuning available to account for the various engine operating conditions.

Thus, a cost effective variable intake manifold is desirable which will work with different types of engines and yet still maximizes the variable tuning available during engine operation to maximize low speed torque and high speed horsepower.

SUMMARY OF THE INVENTION

In its embodiments, the present invention contemplates an intake manifold directing air flow into a multi-cylinder internal combustion engine. The intake manifold includes a manifold housing including a plurality of fixed intake runners, each adapted to align with a respective one of the cylinders; an intake passage; an upper surface; a lower surface; and a plurality of outlet passages, each outlet passage opening into a different one of the fixed intake runners. The housing further includes a mid-section, located between the intake passage and outlet passages, providing an open chamber between the upper and lower surfaces, and a divider located in the chamber so as to divide the chamber into two sections along the general direction of air flow. The intake manifold also includes a runner beam, mounted within the chamber and rotatable therein, with the runner beam including a runner shaft, extending normal to the general direction of air flow, about which rotation takes place. A plurality of runner blades extend radially from the runner shaft out to the upper surface portion of the manifold housing, with the runner blades are generally spaced from one another to allow air flow between them. One of the plurality of runner blades extends circumferentially farther around than the other runner blades and is located adjacent to the divider, and the other of the runner blades are spaced from the intake passage to form a variable plenum between the runner blades and the intake passage, with the one runner blade and divider bisecting the variable plenum into two sections so that any air flow between the two sections is selectively preventable.

Accordingly, an object of the present invention is to provide an intake manifold with a variable plenum upstream of the primary runners that can operate as a single plenum or multiple plenums depending upon the engine operating conditions, without the need for complex or expensive communication valve systems.

It is a further object of the present invention to allow for a variably plenum geometry along with variable intake runner geometry that can vary both the runner length and cross-sectional area to further improve the intake tuned engine speed range for various engine operating conditions.

An advantage of the present invention is that the variable intake manifold will change manifold tuning and flow losses in order to improve performance throughout the varying engine operating conditions, producing better volumetric efficiency.

An additional advantage of the present invention is that a wider range of intake tuning can be had with less rotation of the tuning mechanism since both the length and cross-sectional area of the intake runners can be changed, as well as the plenum volume.

A further advantage of the present invention is that, while the intake runners are variable, there is equal air distribution between cylinders, improving overall engine performance.

DETAILED DESCRIPTION OF THE PREFERRED EMBODIMENTS

Figure 1:
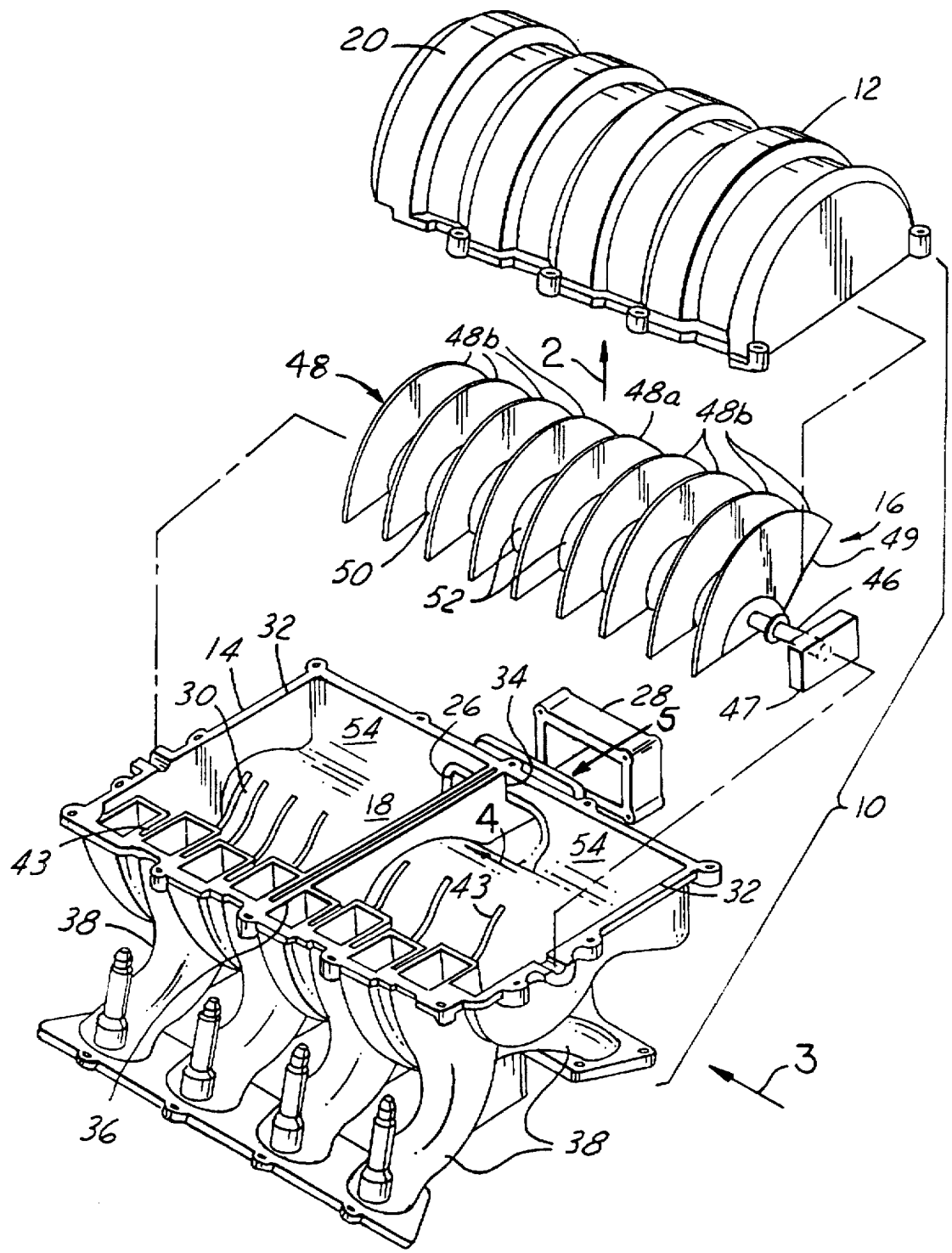
FIG. 1 is an exploded perspective view of an intake manifold assembly in accordance with the present invention.
Figure 2:
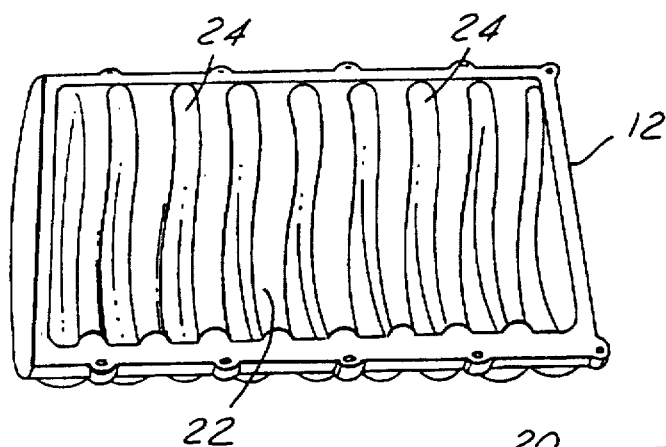
FIG. 2 is a bottom plan view of the upper plenum shell, taken in the direction of arrow 2 in FIG. 1.

For a given valve, port and cylinder configuration, the pressure at the intake valves for each cylinder is what ultimately determines the volumetric efficiency of an engine. The pressure at the valves can be thought of as two components, a fluctuating component and a mean value component, and the intake manifold plays an important role in determining both of these components. Timing the intake valve event such that an increase in the fluctuating component of the pressure occurs near valve closure is what is commonly referred to as intake tuning. The present invention is believed to take advantage of parameters that influence both the fluctuating and mean (i.e., steady flow) components of the pressure in order to improve engine performance.

An intake manifold assembly 10 of the present invention is best described as variable runners and a variable plenum contained within an overall manifold cavity, as is illustrated in FIGS. 1–5. This embodiment illustrates a V-8 type engine 11, with the single manifold assembly 10 supplying intake air to all eight cylinders, (although other types of engine configurations and other numbers of cylinders can also be employed). The manifold assembly 10 is basically formed from three major parts. The first is an upper plenum shell or cover 12, the second is a lower plenum shell or base 14, and the third is a rotatable variable runner beam 16, which is mounted within an overall manifold cavity 18 formed by the first two.

The major parts of the manifold assembly can be fabricated, for example, from NYLON 6™. The parts are preferably injection molded, although the base 14 may be fabricated using a lost core process. The cover 12 is assembled to the base 14 by bolts or the like after inserting the beam 16. By fabricating the parts separately and then attaching them together during assembly, the parts can be later disassembled for servicing.

The cover 12 is generally semi-cylindrical in shape. The outside surface 20 can be shaped many ways including being made up of circular sections. However, the inner surface 22 is not generally circular, as will be discussed below, to account for the variable runner area. The inner surface 22 also includes grooves 24 running in a circumferential direction. There are nine grooves 24, one aligned with each runner blade, as discussed below.

The base 14 includes an inlet passage 26, which is connected to a conventional throttle body 28, shown schematically. This, then, is a conventional plenum throttle type of arrangement, rather than a port throttle controlled configuration.

The inlet passage 26 opens into a curved floor section 30 enclosed by side walls 32. The floor section 30 curves in the same direction (but not the same shape) as the curvature of the inside surface 22 of the cover 12. Together, the floor section 30, side walls 32 and inner surface 22 of the cover 12 form the overall manifold cavity 18. This overall manifold cavity 18 is basically divided into two equal parts by a divider 34. This divider 34 is formed by two adjacent wall portions which extend from the inlet passage 26 across the base 14.

The floor section 30 of the base 14 includes nine slots 43, which align with the grooves 24 in the cover 12. The base 14 also includes eight upstream openings for eight fixed runners 38. The slots 43 extend between the openings 36 and a portion of the fixed runners 38. The divider 34 extends into the middle one of the nine slots 43, so that there are four openings 36 on each side of it.

The fixed runners 38 extend under the floor section 30, each to one of the intake ports 40 of eight engine cylinders 42. Preferably, the openings 36 are centered over the two banks of cylinders 42, so that the fixed runners 38 will be equal in length. The equal length will provide better overall air flow characteristics.

The runner beam 16 is mounted within the main manifold cavity 18 via a runner shaft 46, extending across the base 14, with one end protruding out through the base 14. The runner beam 16 rotates about the centerline of the shaft 46. A bi-directional, driving motor 47, shown schematically, is connected to the runner shaft 46 for driving the rotation of the runner beam 16. The motor 47 is conventional, similar to current intake runner control mechanisms used to open and close port shut of valves, but incorporating a conventional direct drive gear mechanism or the like to rotate the shaft 46.

Mounted about the shaft 46 and extending radially therefrom are nine runner blades 48. Eight of the runner blades 48b, the outer four on either end, extend circumferentially about 130 degrees. The front (upstream) edges 49b, then, of these blades 48b, do not extend circumferentially down to the base 14. Even so, different amounts of circumferential extensions can be used as desired for a particular application. With this embodiment, the upstream edges 49b of eight of the runner blades 48b rotate away from the upstream portion of the floor section 30 under high speed operating conditions, effectively increasing the volume of a variable plenum 54, as discussed below.

The middle runner blade 48a nests into the divider 34 and extends more than 180 degrees circumferentially. The angle $\phi_0$ beyond 180 degrees that this blade 48a extends determines the amount of rotation of the runner beam 16 that will occur before the front (upstream) edge 49a lifts out of the divider 34, allowing for fluid communication over the divider 34. While this embodiment illustrates a divider 34 having two adjacent wall portions, it can also be configured with just one wall portion immediately adjacent to either side of the middle blade 48a to effectively divide the overall manifold cavity 18 into two sections.

Each of the runner blades 48 extends into a respective one of the grooves 24 in the cover and also aligns with a respective one of the slots 43. Thus, the runner blades 48, in effect, form the side walls of eight separate variable intake runners 52. Since eight of the blades 48b do not rotate all of the way down to the portion of the wall of the base 14 with the inlet passage 26 in it, the open area below the front edges 49b forms the variable plenum 54 within the assembly 10. This variable plenum 54 is split into two sections by the divider 34 and the middle runner blade 48a.

Extending from the runner shaft 46 between the runner blades 48 are eight base sections 50. These sections 50 form a base curve from which the runner blades 48 extend, and, together with the inner surface 22 of the cover 12, form the other two walls of the variable intake runners 52. Hence, air entering the inlet passage 26 into the variable plenum 54 will be directed into the variable runners 52, which, in turn, will direct the air into openings 36 of the fixed runners 38. The base sections 50 adjacent to the middle runner blade 48a each also include a channel, not shown, which receive the wall portions of the diver 34.

Figure 6:
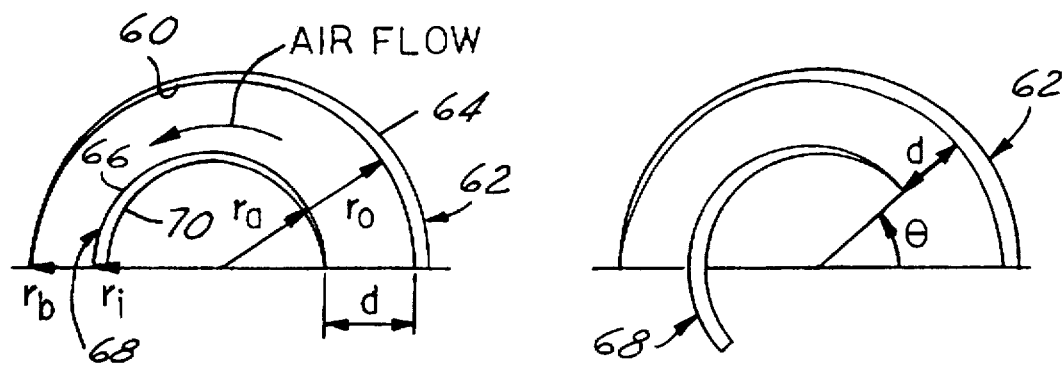
FIG. 6 is a schematic view of the intake runner geometry in accordance with the present invention.
Figure 7:
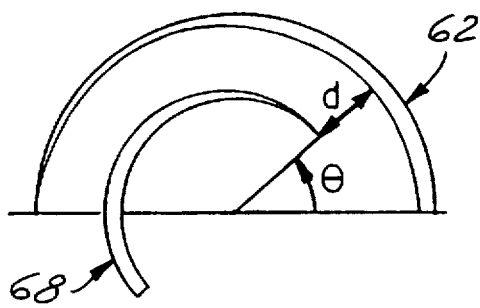
FIG. 7 is a schematic view similar to FIG. 6 representing the runner beam being rotated to a different position.

The curvature of the cover inner surface 22 and the base sections 50 are preferably not circular, but have varying radii as illustrated in FIGS. 6 and 7, in order to allow for a varying cross-sectional area of the variable runners 52 as they are rotated. In FIGS. 6 and 7, the inner surface 60 of the outer arc 62 schematically represents the inner surface 22 of FIGS. 1–5, while the outer surface 64 of the outer arc 62 is shown as a circular arc for reference. The outer surface 66 of the inner arc 68 schematically represents the surface of the base sections 50 in FIGS. 1–5, while the inner surface 70 of the inner arc 68 is shown as a circular arc for reference.

The equations which describe the curvature of the surfaces will now be discussed. In FIG. 6, the inner arc 68 is shown aligned with the outer arc 62, with the initial angle $\theta_0$ between them equal to zero. The radial distance between the inner surface 60 and the outer surface 66 at any point is indicated as d. The radius of the inner circular surface 70 of the inner arc 68 is indicated by $r_a$. The outer surface 66 of the inner arc 68 deviates therefrom, with the variable radius ($r_i$) at a given angle being $r_i = m_1 * \theta + r_a$, with $m_1$ being a chosen constant which determines the rate of change of $r_i$. The radius of the outer circular surface 64 of the outer arc 62 is indicated by $r_b$. The inner surface 60 deviates therefrom, with the variable radius $r_0$ at a given angle being $r_0 = m_2 * (\theta_0 - \theta) + r_b$, with $m_2$ being a chosen constant which determines the rate of change of $r_0$.

The distance d, then, between the outer surface 66 and the inner surface 60 for a particular angle of rotation of the inner arc 68 relative to the outer arc 62 is $d = r_o - r_i$. This results in the equation $d = (r_b - r_a) + m_2\theta_0 - \theta(m_1 + m_2)$. For example, then, the change in the distance d between FIGS. 6 and 7, is 2 mθ, (with θ₀=0 in FIG. 6, and assuming m₁=m₂ so that the distance d is constant along the length of the runner).

Since the cross-sectional area of the variable intake runners 52, as illustrated in FIGS. 1–5, is the distance between the runner blades 48 multiplied by the distance d, the variation in d as the runner beam 16 is rotated will vary the cross-sectional area.

Figure 3:
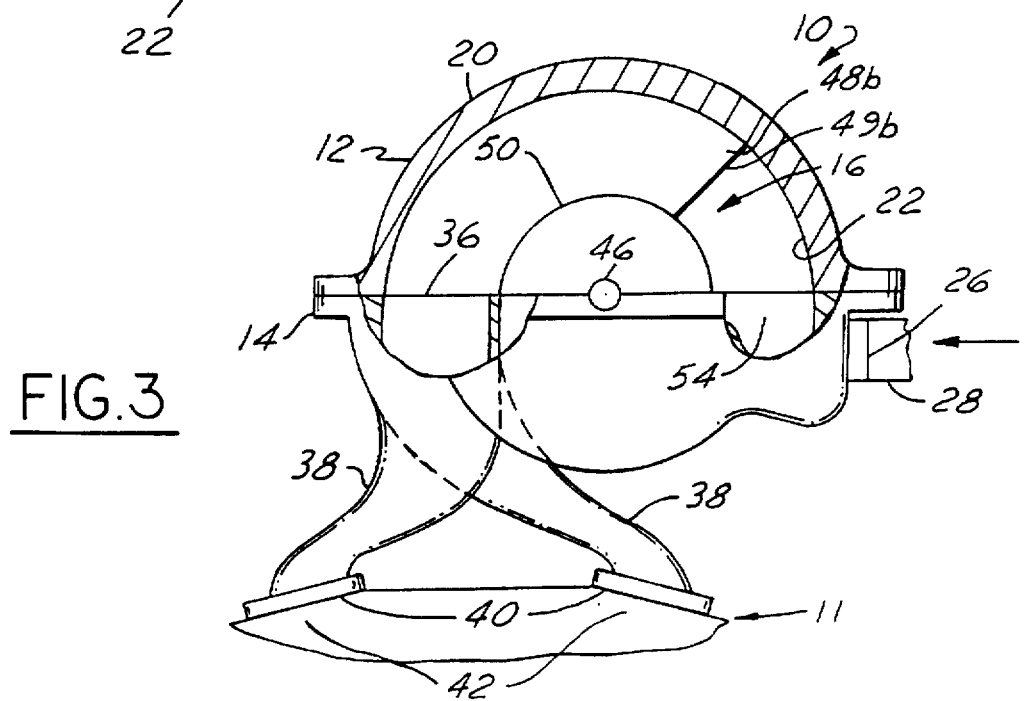
FIG. 3 is a partial cross-sectional view taken in the direction of arrow 3 in FIG. 1.
Figure 4:
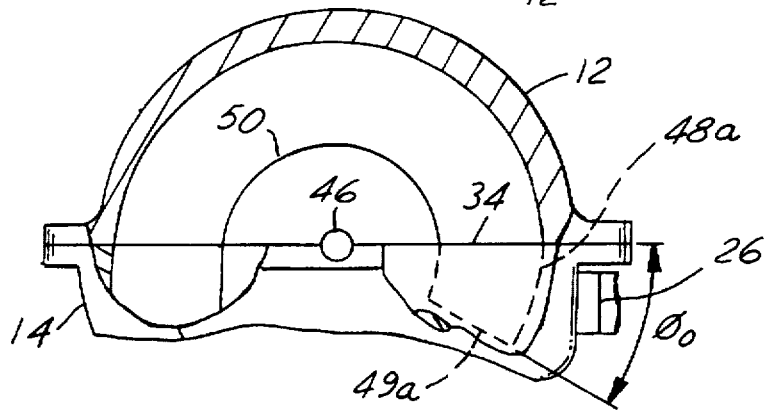
FIG. 4 is a partial cross-sectional view taken in the direction of arrow 4 in FIG. 1.
Figure 5:
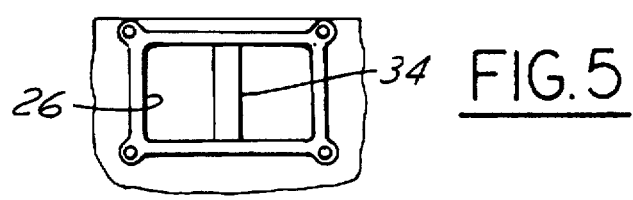
FIG. 5 is a partial side view taken in the direction of arrow 5 in FIG. 1.

Consequently, as the runner beam 16 is rotated counterclockwise (as it is shown in FIG. 3), not only does the length of the variable runner 52 shorten, but also, the cross-sectional area increases. The flow of air, as FIG. 3 is oriented, would be counterclockwise.

In this way, the smaller cross-sectional area, which increases the amplitude of the dynamic component of pressure, is available at lower speeds, as well as the longer length runners, which increases the period of pressure, thus both acting together to improve intake performance.

The intake valve timing is assumed to be fixed, and since in theory it is desirable to maximize the pressure just before valve closing to maximize intake air efficiency, the change in the runner length will change the maximum pressure point. The dimensional changes in the runners 52 causes a shift in the period of the fluctuating air pressure, creating efficient flow for low speeds.

For operation at low engine speeds, the runner beam 16 is rotated all of the way clockwise, as oriented in FIG. 3. This creates the longest length for the variable runners 52, and also the smallest cross-section, which is the preferred tuning for the low engine speeds. For this system, the rotation of the runner beam 16 is a function only of engine speed, and can be easily calibrated to this function.

As the engine speed increases, the runner beam 16 is progressively rotated by the motor 47 counterclockwise, (as viewed from FIG. 3), until it reaches a maximum rotation at the maximum engine speed. As it rotates counterclockwise, the upstream edges 49 of the runner blades 48 retreat from the inlet passage 26. Thus, in this maximum position, the runner lengths 52 are minimum, (by effectively moving the inlet locations to the variable runners 52), and the cross-sectional area has reached a maximum, again being the preferred tuning for the given engine speed. Also, since the upstream edges 49 of the runner blades 48 have rotated away from the inlet passage 26, the rotation has also effectively increased the overall size of the variable plenum 54.

Furthermore, at higher speeds, when the runner beam 16 is rotated counterclockwise from its initial position by the angle of $\phi_0$ or more, the variable plenum 54 changes from two separate volumes to effectively one larger plenum volume. During low speed operation, by effectively having two smaller plenum sections of the variable plenum 54, each portion is only exposed to the firing frequency of four cylinders instead of eight. This effectively cuts the firing frequency in half for the low speed conditions wherein the variable plenum 54 is split. By cutting the frequency in half, the low speed flow characteristics are further improved while at high engine speeds, the flow losses are minimized. While this illustrates a split into only two plenums, of course other geometries and numbers of plenum sections can be used.

At high engine speeds, the steady flow losses through an intake runner become increasingly significant. The manifold assembly 10 of the present invention acts to reduce the pressure losses at high engine speeds in a couple of respects. First, as the runner beam 16 rotates, the total length of the runners 52 decrease as discussed above, but beyond this, the reduction is entirely within an effective bend in the runners 52. Bends and sudden expansions or contractions in flow passages increase the pressure drop through the passages. These types of losses are termed "minor losses" in fluid mechanics; however, they are responsible for a substantial portion of the flow losses in an intake manifold. Steady flow pressure drop across a bend is related to flow velocity. As the runner beam 16 is rotated, the decreased bend length results in a corresponding decrease in the value of a constant (determined by the radius and length of bend). This lowers the mean flow pressure drop through the runners 52. Second, a reduction in the steady loss term also results from the increasing the cross-sectional area, discussed above, since the flow velocity in the runners 52, for a given volume of flow, will be lower. Thus, high engine speed intake efficiency is further improved.

While certain embodiments of the present invention have been described in detail, those familiar with the art to which this invention relates will recognize various alternative designs and embodiments for practicing the invention as defined by the following claims.

I claim:

1. An intake manifold directing air flow into a multicylinder internal combustion engine comprising:

a manifold housing including a plurality of fixed intake runners, each adapted to align with a respective one of the cylinders; an intake passage; an upper surface; a lower surface; and a plurality of outlet passages, each outlet passage opening into a different one of the fixed intake runners; with the housing further including a mid-section, located between the intake passage and outlet passages, providing an open chamber between the upper and lower surfaces, and with a divider located in the chamber so as to divide the chamber into two sections along the general direction of air flow; and a runner beam, mounted within the chamber and rotatable therein, with the runner beam including a runner shaft, extending normal to the general direction of air flow, about which rotation takes place; and a plurality of runner blades extending radially from the runner shaft out to the upper surface portion of the manifold housing, generally spaced from one another to allow air flow between them; with one of the plurality of runner blades extending circumferentially farther around than the other runner blades and located adjacent to the divider, and the other of the runner blades spaced from the intake passage to form a variable plenum between the runner blades and the intake passage, with the one runner blade and divider bisecting the variable plenum into two sections so that any air flow between the two sections is selectively preventable.

2. The intake manifold of claim 1 further including a plurality of base sections mounted to the runner shaft between the runner blades that, together with the corresponding runner blades and the upper surface portion of the manifold housing, define runner passages, one each to a respective one of the outlet passages.

3. The intake manifold of claim 2 wherein each of the base sections has a varying radius, each radius varying about its circumference to vary the respective cross-sectional area of the corresponding runner upon rotation of the runner beam.

4. The intake manifold of claim 3 wherein the upper surface portion has a radius which varies about its circumference to vary the cross-sectional area of each of the variable runners upon rotation of the runner beam.

5. The intake manifold of claim 4 wherein the rate of change in radial distance between the upper surface portion and the base sections is proportional to 2 mθ, with m being a predetermined constant and θ being an angle of rotation between the two.

6. The intake manifold of claim 5 wherein the one of the plurality of runner blades is extendible circumferentially into the divider by an angle $\phi_0$, and the runner shaft is rotatable by an angle greater than $\phi_0$ to selectively allow flow between the two sections of the variable plenum.

7. The intake manifold of claim 6 wherein the upper surface portion of the manifold housing includes grooves therein which receives and guides a portion of each of the runner blades.

8. The intake manifold of claim 1 wherein the lower surface of the manifold housing includes slots within which the runner blades are slidable.

9. The intake manifold of claim 1 wherein the upper surface portion of the manifold housing includes grooves therein which receives and guides a portion of each of the runner blades.

10. The intake manifold of claim 1 wherein the variable runner passages are curvilinear.

11. The intake manifold of claim 1 wherein the one of the plurality of runner blades is extendible circumferentially into the divider by an angle $\phi_0$, and the runner shaft is rotatable by an angle greater than $\phi_0$ to selectively allow flow between the two sections of the variable plenum.

12. The intake manifold of claim 11 wherein the divider is comprised of two parallel walls and the one runner blade is mounted between the two walls.

13. A multi-cylinder engine for a vehicle comprising:
   a plurality of intake ports;
   a throttle body;
   a manifold housing including an intake passage and a plurality of fixed intake runners, each aligned with a respective one of the cylinders, with a plurality of outlet passages each opening into a different one of the fixed intake runners, and with the housing further including an upper surface, a lower surface and a mid-section, located between the intake passage and outlet passages, providing an open chamber, and with a divider located in the chamber so as to divide the chamber into two sections; and
   a runner beam, mounted within the chamber and rotatable therein, with the runner beam including a runner shaft, extending normal to the general direction of air flow, about which rotation takes place; a plurality of runner blades extending radially from the runner shaft extending out to the upper surface portion of the manifold housing and generally spaced from one another to allow air flow between them, with one of the plurality of runner blades extending circumferentially farther around than the other runner blades and located adjacent to the divider; and a plurality of base sections mounted to the runner shaft between the runner blades that, together with the corresponding blades and the upper surface portion of the manifold housing, define variable runner passages, one each to a respective one of the outlet passages.

14. The engine of claim 13 wherein the other of the runner blades are spaced from the intake passage to form a variable plenum between the runner blades and the intake passage, with the one runner blade and divider bisecting the variable plenum into two sections, with the air flow between the two sections selectively preventable.

15. The engine of claim 14 wherein the one of the plurality of runner blades is extendible circumferentially into the divider by an angle $\phi_0$, and the runner shaft is rotatable by an angle greater than $\phi_0$ to selectively allow flow between the two sections of the variable plenum.

16. The engine of claim 13 further comprising a motor coupled to the runner shaft, for selectively causing rotation of the shaft.

17. The engine of claim 13 wherein each of the base sections has a varying radius, each radius varying about its circumference to vary the respective cross-sectional area of the corresponding runner upon rotation of the runner beam, and the upper surface portion also has a radius which varies about its circumference to also vary the cross-sectional area of each of the variable runners upon rotation of the runner beam.

18. The engine of claim 13 wherein the lower surface of the manifold housing includes slots within which the runner blades are slidable.

* * * * *